US008896877B2

(12) United States Patent
Yamamuro (10) Patent No.: US 8,896,877 B2
(45) Date of Patent: Nov. 25, 2014

(54) PRINT DATA GENERATING APPARATUS, PRINT DATA GENERATING METHOD, AND COMPUTER READABLE STORAGE MEDIUM STORING PRINT DATA GENERATING PROGRAM

(75) Inventor: Tatsuro Yamamuro, Kashiwa (JP)

(73) Assignee: Konica Minolta Business Technologies, Inc. (JP)

( * ) Notice: Subject to any disclaimer, the term of this patent is extended or adjusted under 35 U.S.C. 154(b) by 589 days.

(21) Appl. No.: 13/155,325

(22) Filed: Jun. 7, 2011

(65) Prior Publication Data

US 2011/0299127 A1    Dec. 8, 2011

(30) Foreign Application Priority Data

Jun. 8, 2010   (JP) .................................. 2010-131132

(51) Int. Cl.
*G06K 15/02*    (2006.01)
*G06F 3/12*    (2006.01)
(52) U.S. Cl.
CPC ............ *G06F 3/1205* (2013.01); *G06F 3/1243* (2013.01); *G06F 3/1247* (2013.01); *G06F 3/1285* (2013.01)
USPC ........ 358/1.18; 358/1.15; 358/1.13; 358/1.14
(58) Field of Classification Search
USPC ....................................... 358/1.15
See application file for complete search history.

(56) References Cited

U.S. PATENT DOCUMENTS

| 2002/0046225 | A1 | 4/2002 | Sugahara | |
| 2006/0044614 | A1* | 3/2006 | Cohen et al. | 358/1.18 |
| 2008/0165383 | A1 | 7/2008 | Myoki | |
| 2011/0261412 | A1* | 10/2011 | Nakatsuka | 358/1.18 |

FOREIGN PATENT DOCUMENTS

| JP | 2002-073297 | 3/2002 |
| JP | 2008-171033 | 7/2008 |

OTHER PUBLICATIONS

Speaking in Tongues http://www.fujixerox.com.au/products/image/media/TSR-0906-Speak-Tongues-reprint.pdf (2007).*
Notification of Reason for Refusal issued by JPO for JP 2010-131132, mailed Nov. 19, 2013, 2 pgs.
Translation of the Notification of Reason for Refusal issued by JPO for JP 2010-131132, mailed Nov. 19, 2013, 2 pgs.
News & Topics, Monthly Professional DTP, Nov. 2003 issue, Japan, Kougakusha, Nov. 1, p. 122 (2003) with English translation of all relevant portions.

* cited by examiner

*Primary Examiner* — Huo Long Chen
(74) *Attorney, Agent, or Firm* — Squire Patton Boggs (US) LLP (57) ABSTRACT

The print data generating apparatus capable of generating print data for VDP in a plurality of formats, classifies an object layout of the print data (steps from S107 to S109, or steps from S112 to S114), selects a predetermined format for the classification result in the steps from S107 to S109 or in the steps from S112 to S114, from the plurality of formats (S111, S116, or S117), and generates the print data in the selected format in S111, S116, or S117 (S118).

2 Claims, 7 Drawing Sheets

| custcode | fname | gname | address | hokkaido | plan | map |
|---|---|---|---|---|---|---|
| 1966012 | Aikawa | Nana | 5-5-6, Omiya-Nakacho, Saitama City, Saitama | 1.jpg | A.jpg | a.jpg |
| 1966004 | Ishida | Sayaka | 1-19-13, Nezu, Bunkyo Ward, Tokyo | 1.jpg | B.jpg | b.jpg |
| 1966005 | Kimura | Hiromi | 2-1-15, Otowa, Bunkyo Ward, Tokyo | 1.jpg | C.jpg | c.jpg |
| 1966011 | Kojima | Miki | 5-5-6, Kita-Aoyama, Minato Ward, Tokyo | 1.jpg | A.jpg | d4.jpg |
| 1966003 | Tajima | Kaori | 2-1-7, Nishi Ward, Yokohama City, Kanagawa | 1.jpg | B.jpg | e.jpg |
| 1966007 | Tsuchiya | Hana | 6-10-3, Kawaguchi, Kawaguchi City, Saitama | 1.jpg | C.jpg | a.jpg |
| 1966010 | Toyama | Keiko | 7-10-4, Kawagoe, Kawagoe City, Saitama | 1.jpg | A.jpg | b.jpg |
| 1970012 | Ozawa | Mina | 5-5-10, Kita-Aoyama, Minato Ward, Tokyo | 1.jpg | B.jpg | c.jpg |
| 1970004 | Nakayama | Yoko | 5-9-3, Wada, Suginami Ward, Tokyo | 1.jpg | C.jpg | d.jpg |
| 1970005 | Nishino | Hiroko | 2-2-4, Midori, Midori Ward, Yokohama City, Kanagawa | 1.jpg | A.jpg | e.jpg |
| 1970011 | Hayama | Hiromi | 5-9-8, Sankenchaya, Setagaya Ward, Tokyo | 1.jpg | B.jpg | a.jpg |
| 1970003 | Hirata | Masako | 2-6, Ichibancho, Chiyoda Ward, Tokyo | 1.jpg | C.jpg | b.jpg |
| 1970007 | Mashiko | Masako | 5-5-3, Shinagawa, Shinagawa Ward, Tokyo | 1.jpg | A.jpg | c.jpg |
| 1970010 | Yasuda | Miho | 6-8-14, Jiyugaoka, Meguro Ward, Tokyo | 1.jpg | B.jpg | d.jpg |
| 1960012 | Yoshii | Jun | 1-4-5, Asahicho, Kawasaki Ward, Kawasaki City, Kanagawa | 1.jpg | C.jpg | e.jpg |
| 1960004 | Wada | Asako | 4-4-6, Higashi-Narashino, Narashino City, Chiba | 1.jpg | A.jpg | a.jpg |

| No. | Object |
|---|---|
| 0 | Hokkaido |
| 1 | plan |
| 2 | map |
| 3 | address |
| ⋮ | ⋮ |
| 1024 | |

↑ Lower level

T

PRINT DATA GENERATING APPARATUS, PRINT DATA GENERATING METHOD, AND COMPUTER READABLE STORAGE MEDIUM STORING PRINT DATA GENERATING PROGRAM

CROSS-REFERENCE TO RELATED APPLICATION

This application is based on Japanese Patent Application No. 2010-131132 filed on Jun. 8, 2010, the contents of which are incorporated herein by reference.

BACKGROUND

1. Technical Field

The present invention relates to a print data generating apparatus used for Variable Data Printing, a print data generating method, and a computer readable storage medium storing a print data generating program.

2. Description of Related Arts

Variable Data Printing (hereinafter referred to as "VDP") has been widely used in recent years as it helps efficient creation of a printed document such as a direct mail that includes partially-varying contents from record to record. For example, Japanese Unexamined Publication No. 2008-171033 discloses a VDP client apparatus capable of generating print data for VDP in a print job format like PPML (Personalized Print Markup Language), FreeForm®, VPS®, VIPP®, etc.

Each of these print job formats applicable to VPD is suitable for handling some object layouts but unsuitable for handling other object layouts while object layouts differ significantly from one print job to another. The wording of being suitable for handling an object layout herein refers to being optimized for processing print data with the relevant object layout, thereby being capable of completing the print job processing within a shorter period of time than other print job formats. In general, the number of copies to be printed by a VDP system may amount to several thousands, or even to tens of thousands, and therefore its print time will be substantially prolonged if it uses an unsuitable format for handling the object layout of the VDP print data.

The present invention is intended to solve the aforementioned problems in the prior art, and one of the objectives of the present invention is to provide a print data generating apparatus, a print data generating method, and a computer readable storage medium storing a print data generating program used for generating VDP data, which are capable of avoiding the prolonged processing time due to selection of an unsuitable format for handling the object layout of the VDP data for printing.

SUMMARY

In order to achieve at least one of the aforementioned objectives, a print data generating apparatus, reflecting one aspect of the present invention, is capable of generating print data for VPD in a plurality of formats, and comprises: a layout classifying unit for classifying layout of objects which constitute said print data; a format selecting unit for selecting a predetermined format for classification result by said layout classifying unit from said plurality of formats; and a data generating unit for generating said print data in said selected format by said format selecting unit.

Preferably, said plurality of formats includes a first format which involve treating a common object to all records in distinction from other objects, said layout classifying unit classifies said layout into a first group if said layout contains a common object to all records, and said format selecting unit selects said first format if said layout is classified into said first group by said layout classifying unit.

Preferably, said plurality of formats include a second format which involves treating a common object to more than one record in distinction from other objects, said layout classifying unit classifies said layout into a second layout if said layout contains a common object to more than one record but not to all records, and said format selecting unit selects said second format if said layout is classified into said second layout by said layout selecting unit.

Preferably, said plurality of formats includes a first format which involves treating a common object to all records in distinction from other objects, and a third format which involves treating a common object to more than one record without distinction from other objects, said layout classifying unit classifies said layout into a first group if said layout contains a common object to all records and total data size of common objects to all records exceeds a threshold value, and classifies said layout into a third group if said layout contains a common object to all records and total data size of common objects to all records does not exceed said threshold value, and said format selecting unit selects said first format if said layout is classified into said first group by said layout classifying unit, and selects said third format if said layout is classified into said third group.

Preferably, said plurality of formats further include a second format which involves treating a common object to more than one records in distinction from other objects, said layout classifying unit classifies said layout into a second layout if said layout contains a common object to more than one record but not to all records and total data size of common objects to a plurality of records but not to all records exceeds said threshold value, and classifies said layout into said third layout if said layout contains a common object to more than one record but not to all records and total data size of common objects to more than one record but not to all records does not exceed said threshold value, and said format selecting unit selects said second format if said layout is classified into said second layout by said layout selecting unit.

The objectives, features, and characteristics of this invention other than those set forth above will become apparent from the description given herein below with reference to preferred embodiments illustrated in the accompanying drawings.

DETAILED DESCRIPTION

The embodiments of this invention will be described below with reference to the accompanying drawings.

Figure 1:
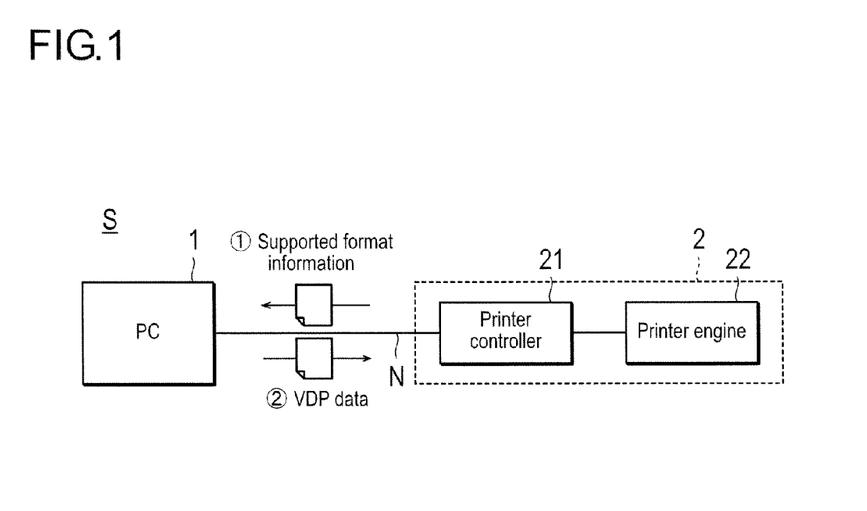
FIG. 1 is a block diagram showing the structure of an image forming system according to an embodiment of the present invention.

FIG. 1 is a block diagram showing the overall structure of an image forming system S according to an embodiment of the present invention. As can be seen from FIG. 1, the image forming system S includes a PC 1 which serves as a print data generating apparatus for generating print data for VDP (hereinafter referred to as "VDP data"), and a printer 2 which serves as an image forming apparatus for executing print processing based on the VDP data received from the PC 1, and these apparatuses are connected via a network N. The network N is a LAN complying with a standard like Ethernet®, Token Ring, FDDI, etc., or a WAN which consists of a plurality of LANs connected one another. The PC 1 and the printer 2 can also be locally connected with each other.

As shown in FIG. 1, the printer 2 is equipped with a printer controller 21 for executing various image processing of the VDP data received from the PC 1 such as RIP (Raster Image Processing), and a printer engine 22 for executing a print processing based on the raster data after the image processing by the printer controller 21. Like the data flow shown in FIG. 1, the PC 1 acquires supported format information from the printer controller 21 prior to the VDP data generation. The supported format information herein refers to information showing the VDP data formats that are supported by the printer controller 21. The supported format information will be described more in detail later. The printer controller 21 can also be a separate device from the printer 2 while FIG. 1 indicates that the printer controller 21 is a built-in device of the printer 2 in FIG. 1.

Figure 2:
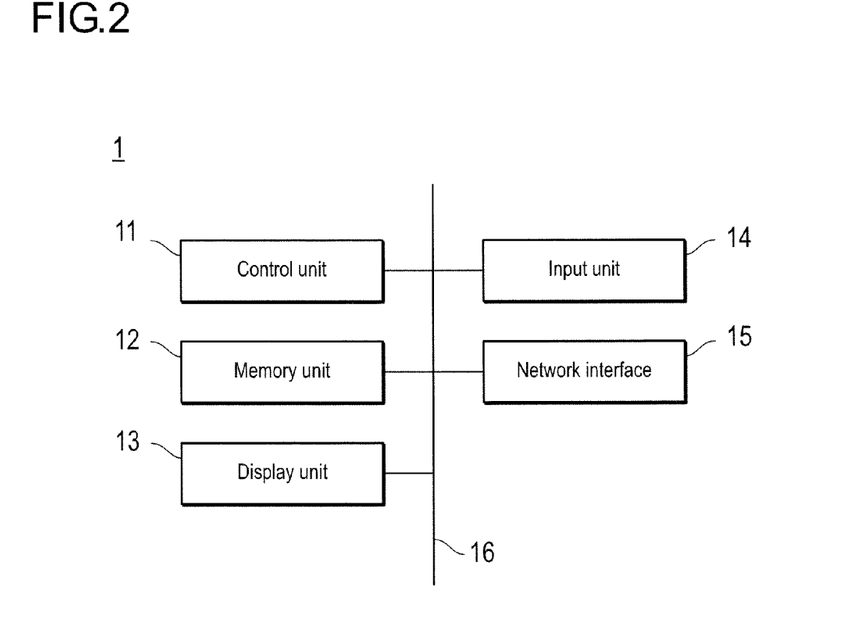
FIG. 2 is a block diagram showing the structure of a PC according to an embodiment of the present invention.

The structures of the aforementioned devices will be shown below. FIG. 2 is a block diagram showing the structure of the PC 1 according to the present embodiment. As shown in FIG. 2, the PC 1 includes a control unit 11, a memory unit 12, a display unit 13, an input unit 14, and a network interface 15, and these units are connected by a bus 16 for exchanging signals. Details on these units will be described below.

The control unit 11 is a CPU which controls the operation of each unit in accordance with control programs, and also performs various calculations. The memory unit 12 includes a ROM for storing various programs, a RAM for temporarily retaining various kinds of data to serve as a working area, and a hard disk for temporarily storing various programs.

The display unit 13 is a display device such as a liquid crystal device, for displaying various information to user. The input unit 14 is an input device such as a keyboard and a mouse, for receiving various operational instructions from user. The supported format information as mentioned above is received from the printer controller 21 to be temporarily stored in the RAM of the memory unit 12. The network interface 15 is an interface for connecting the PC 1 to the network N and communicating with other devices on the network N including the printer 2.

The PC 1 with the aforementioned structure has a VDP software installed on itself. VPD software herein refers to an application program used for acquiring user's instruction concerning an object layout of VDP data via the display unit 13 and the input unit 14, and for generating VDP data in the format according to the acquired instruction. The VDP software according to the present embodiment supports various formats including FreeForm®, PPML, and Optimized PS. Details on these formats will be described below.

FreeForm® is a format intended for Fiery controller of Electronics for Imaging, Inc., and FreeForm® involves registering a common object to all the records with a Fiery controller to treat them as a Master Template, and superimposing variable objects onto the Master Template.

In other words, FreeForm® involves treating a common object to all the records in distinction from other objects, and therefore this format is suitable for handling an object layout which contains a common background to all the pages. This is because FreeForm® involves one-time RIP of the common background, thereby avoiding repetition of RIP of the common background and thus contributing shortened processing time.

However, FreeForm® is not considered as a suitable format regardless of existence of a common background to all the pages if the total data size of the common backgrounds does not exceed a predefined threshold value. This is because VDP data with data size below the threshold value will be handled more efficiently by a general-purpose format like Optimized PS which handles all the objects without discrimination, rather than being handled by FreeForm® that involves superimposing variable objects onto the common backgrounds on a page-by-page basis. Besides, FreeForm® will not treat a common background in distinction from other objects if the common background overlaps a variable object.

PPML is a VDP format based on XML (Extensive Markup Language), which involves classifying constituent objects of VDP data into common objects to more than one records (generally referred to as "reusable objects") and varying objects from record to record (generally referred to as "variable objects") and superimposing the variable objects cached in a memory onto the reusable objects on a page-by-page basis.

In other words, PPML is a format which involves treating a common object to more than one record (i.e. a reusable object) in distinction from other objects, and is considered as being suitable for handling an object layout which contains a common background to more than one page but not to all the pages. This is because PPML involves one-time RIP of the common background to more than one page, thereby avoiding repetition of RIP of the common background and thus contributing shortened processing time.

However, PPML is not considered as being a suitable format regardless of existence of a common background to more than one record if the total data size of the common backgrounds does not exceed a predefined threshold value. This is because VDP data with data size below the threshold value will be handled more efficiently by a general-purpose format like Optimized PS which handles all the objects without distinction, rather than being handled by PPML that involves superimposing variable objects on the common backgrounds on a page-by-page basis.

Optimized PS is an optimized version of PostScript which ensures that a reusable object will be described only once throughout the entire data. In other words, Optimized PS involves treating reusable objects and variable objects without distinction from each other. Optimized PS is also considered as a general-purpose format as it can be used both for printing VPD data and non VDP data. Optimized PS is therefore considered as a suitable format for handling an object layout which contains a common background to all the pages (or to more than one page) if the total size of the common backgrounds does not exceed the threshold value.

Considering the characteristics of the various formats mentioned above, an object layout of VDP data should be classified into any of the Group 1 to Group 3 shown in Table 1 below from the purpose of selecting it s most suitable format. The VDP software according to the present invention is capable of classifying an user-specified object layout into any of Group 1 to Group 3 in Table 1, and generating VDP data in the most suitable format for each Group.

TABLE 1

| Group | Layout structure | Most suitable Format |
|---|---|---|
| Group 1 | A layout containing a common background to all records (only if the total data size of the common backgrounds exceeds a predefined threshold value). | FreeForm ® |
| Group 2 | A layout containing a common background to more than one record but not to all the records (only if the total data size of the common backgrounds exceeds a predefined threshold value). | PPML |
| Group 3 | A layout containing a common background to all the records or to more than one record (only if the total data size of the common backgrounds does not exceed a predefined threshold value). | Optimized PS |

Figure 5A:
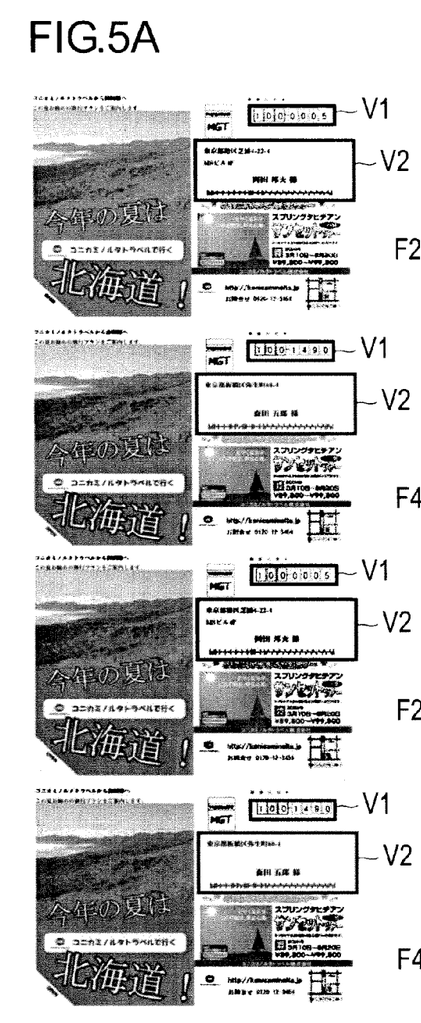
FIG. 5A is a schematic diagram illustrating an object layout of VDP data according to an embodiment of the present invention.

FIG. 5A and FIG. 5B show sample layouts of VDP data to be generated according to the present embodiment. The object layout shown in FIG. 5A contains the variable objects V1 and V2 corresponding to postal code and name and address, respectively, and the remaining part of the page in each record represents a common background to all the records. In this example, the total data size of the common background shall exceed the threshold value as it contains large-size image data. This means that the layout shown in FIG. 5A will be classified into the Group 1 shown in the Table 1, and FreeForm® turns out to be the most suitable format for handling the layout.

Figure 5B:
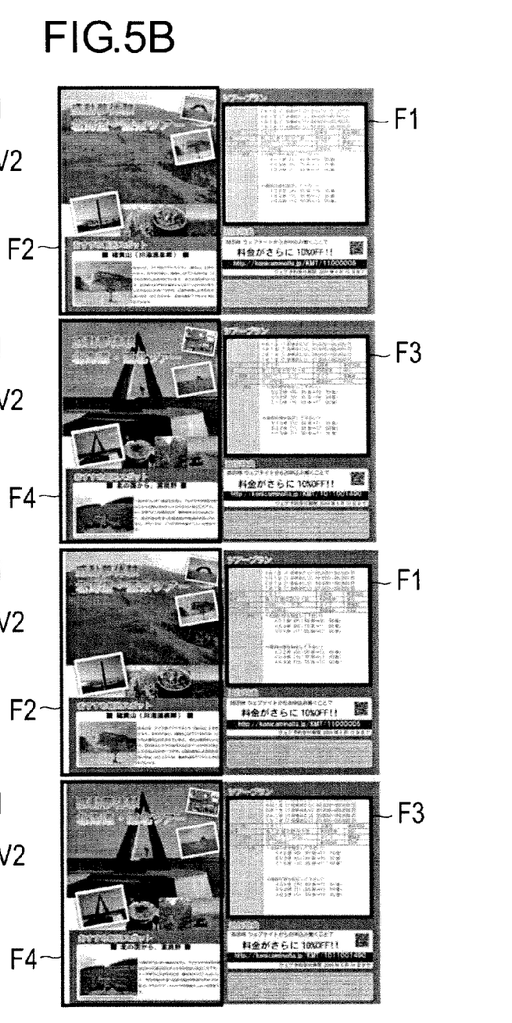
FIG. 5B is a schematic diagram illustrating an object layout of VDP data according to an embodiment of the present invention.

On the other hand, the object layout shown in FIG. 5B contains the reusable objects F1, F2, F3 and F4 which represent common backgrounds to more than one record (i.e. to two records), and the total data size of these common backgrounds shall exceed the threshold value as each of them contains large-size image data. This means that the layout shown in FIG. 5B will be classified into the Group 2 in the Table 1, and PPML turns out to be the most suitable format for handling the layout.

Figure 3:
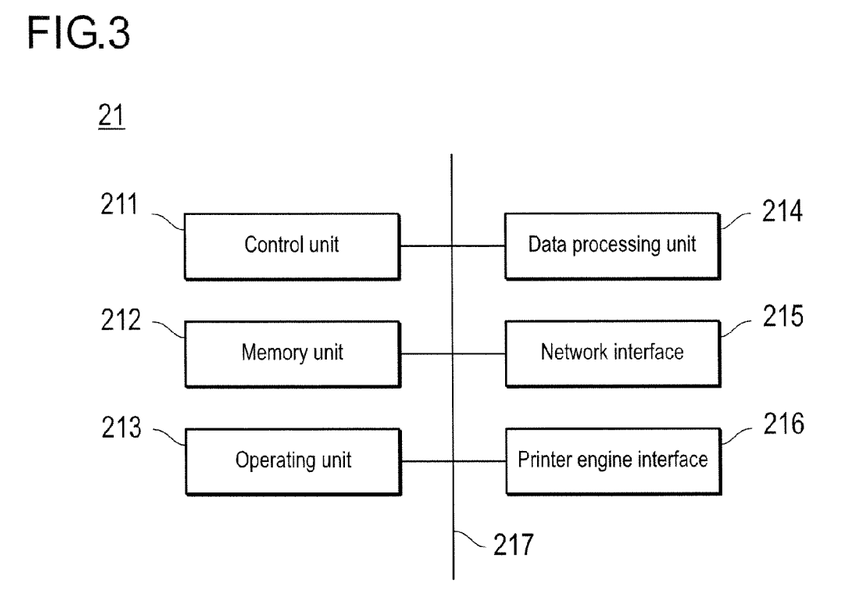
FIG. 3 is a block diagram showing the structure of a printer controller according to an embodiment of the present invention.

FIG. 3 shows a block diagram showing the structure of a printer controller 21 according to an embodiment of the present invention. As shown in FIG. 3, the printer controller 21 according to the present embodiment includes a control unit 211, a memory unit 212, an operating unit 213, a data processing unit 214, a network interface 215, and a printer engine interface 216, and these units are connected via a bus 217 for exchanging signals. Details on these units will be described below.

The control unit 211 is a CPU which controls the operation of each unit in accordance with control programs, and also performs various calculations. The memory unit 212 includes a ROM for storing various programs, a RAM for temporarily retaining various kinds of data to serve as a working area, and a hard disk for temporarily storing various programs.

The operating unit 213 is an operation panel capable of displaying status information of the printer 2 and receiving various setting instructions from user. The data processing unit 214 analyzes the VDP data received from the PC 1 in order to generate raster image data to be used for print processing by the printer engine 22.

The network interface 215 is an interface complying with a standard like Ethernet®, Token Ring, FDDI, etc., used for communicating with an external equipment such as PC 1 via the network N. The network interface 216 is a parallel interface like IEEE 1394, used for communicating with the printer engine 22.

Figure 4:
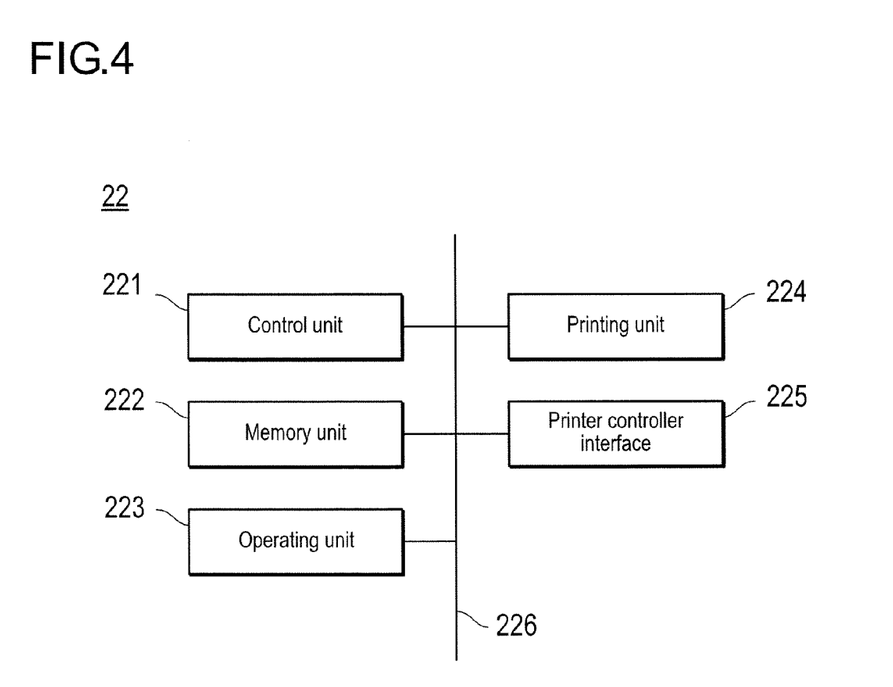
FIG. 4 is a block diagram showing the structure of a printer engine according to an embodiment of the present invention.

FIG. 4 is a block diagram showing the structure of the printer engine 22 according to an embodiment of the present embodiment. As shown in FIG. 4, the printer engine 22 includes a control unit 221, a memory unit 222, an operating unit 223, a printing unit 224, and a printer controller interface 225, and these units are connected one another via a bus 226 for exchanging signals. Details on these units will be described below.

The control unit 221, the memory unit 222, and the operating unit 223 are built-in units of the control unit 211, the memory unit 212, and the operating unit 213 of the printer controller 21, respectively. Therefore, the details on these units are omitted. The printing unit 224 will be described later. The printer controller interface 225 is a parallel interface complying with a standard like IEEE 1394, used for communicating with the printer controller 21.

The printing unit 224 prints out the images based on the bitmap data received from the printer controller 21. More specifically, the printing unit 224 executes print processing of the bitmap data, which includes a charging step for charging a photoconductive drum, an exposing step for forming an latent image on the surface of the photoconductive drum by a laser beam, a developing step for forming a toner image by applying toner to the latent image on the photoconductive drum, a transferring step for transferring the toner image on the photoconductive drum to the recording paper by a transfer belt, and a fixing step for heating and fixing the toner image transferred to the recording paper by a fixing roller. The printing unit 224 can also adopt a different printing method such as the impact method, the thermal transfer method, and the ink-jet method, instead of the electro-photographic method as described above.

Figure 6A:
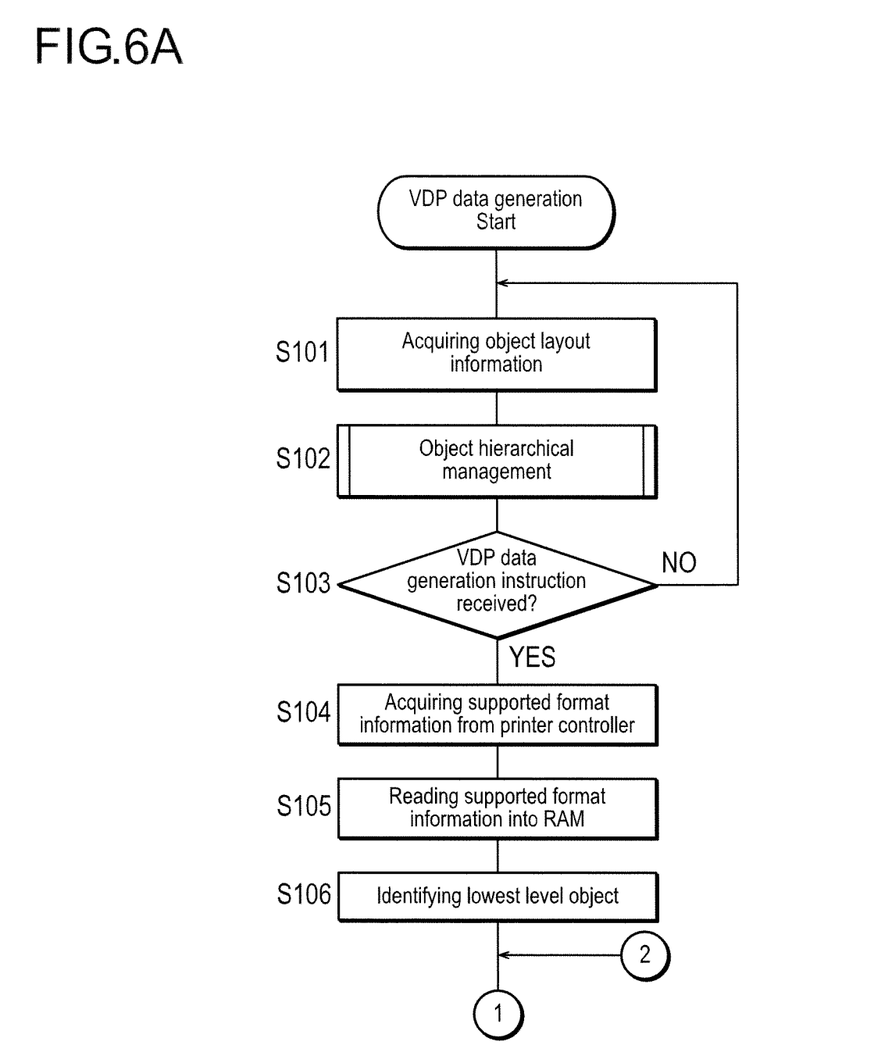
FIG. 6A is a flowchart showing the steps of VDP data generation according to an embodiment of the present invention.
Figure 6B:
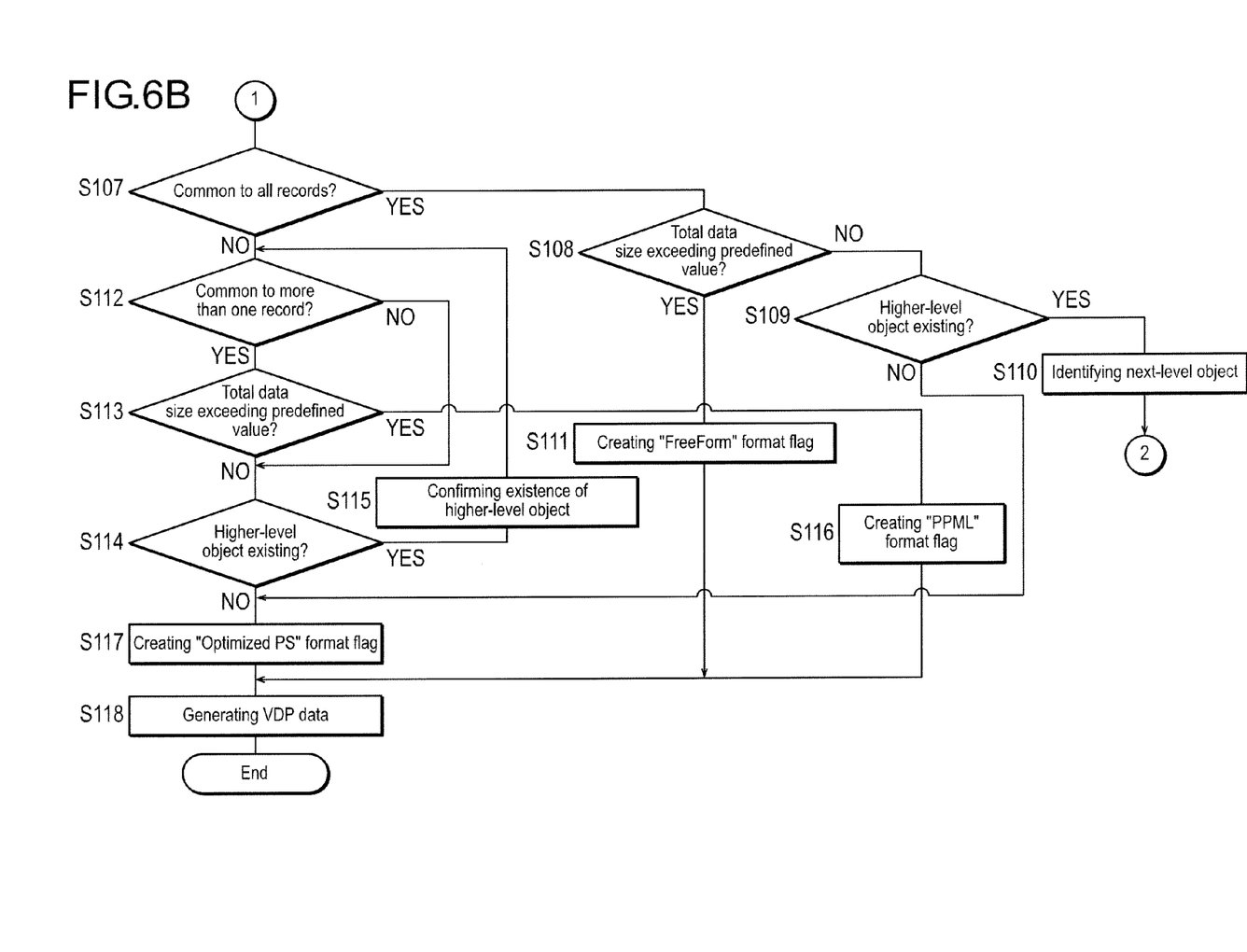
FIG. 6B is a flowchart showing the steps of VDP data generation according to an embodiment of the present invention.
Figure 7:
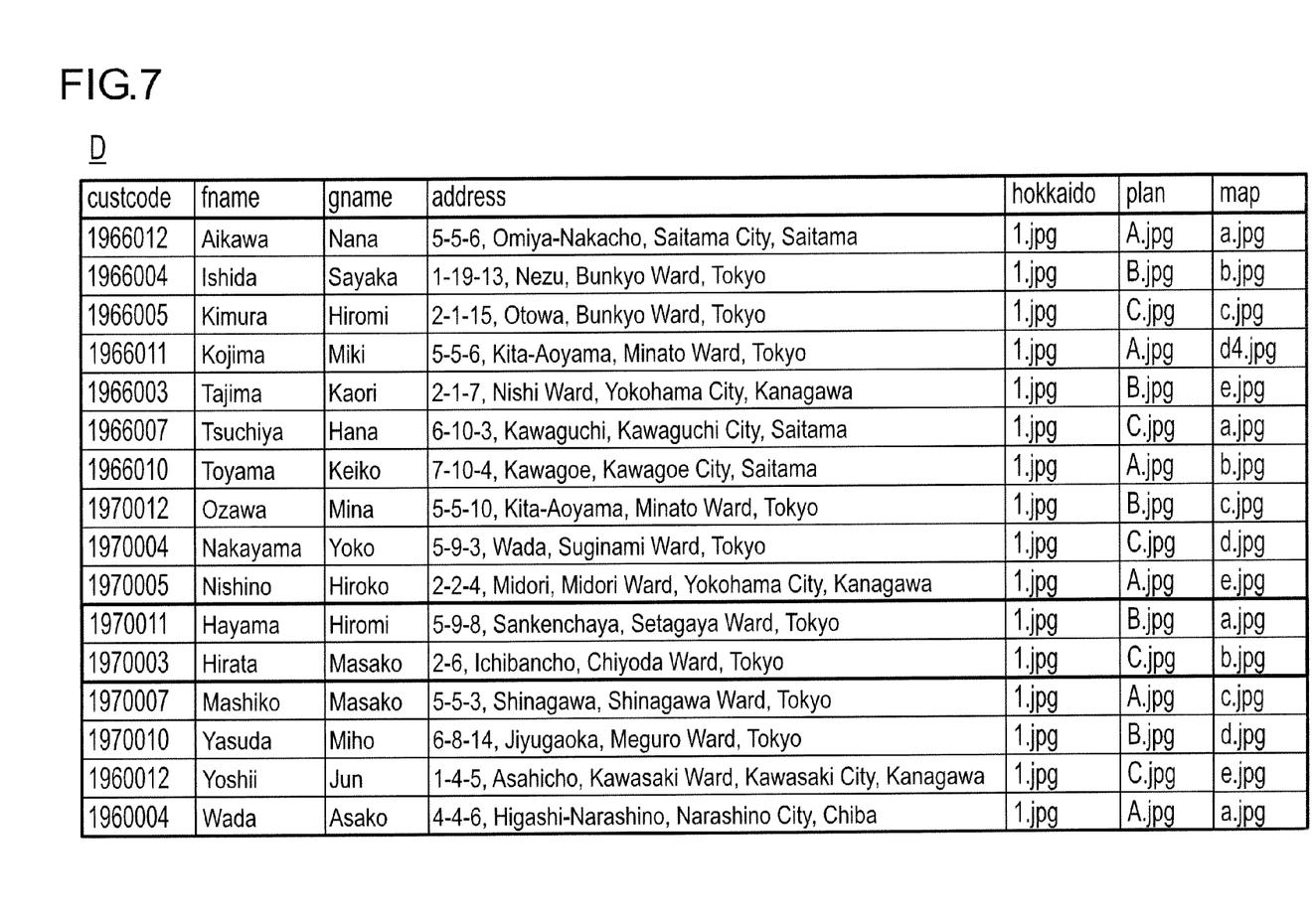
FIG. 7 is a schematic diagram illustrating a database storing the constituent objects of VDP data according to an embodiment of the present invention.

The following is an outline of the operation of the PC 1 according to the present embodiment. FIG. 6A and FIG. 6B shows a flowchart illustrating the steps of the VDP data generation executed by the VDP software operating on the PC 1. The algorithm shown in the flowchart in FIG. 6A and FIG. 6B is stored as a control program in the ROM of the memory unit 12, and is read into the RAM when the operation starts. FIG. 7 shows a sample database D containing constituent objects of the VDP data to be generated by the VDP data generation according to the present embodiment. Each row and column in the database D shown in FIG. 7 corresponds to each record and each object, respectively.

First, the PC 1 displays a GUI for layout setting (not shown) on the display unit 13, and receives an instruction regarding a layout of the constituent objects (hereinafter referred to as "layout instruction") from an user operating the GUI by the input unit 14 (S101). The PC 1 then executes the object hierarchical management (S102) based on the layout instruction received in S101.

Figure 8:
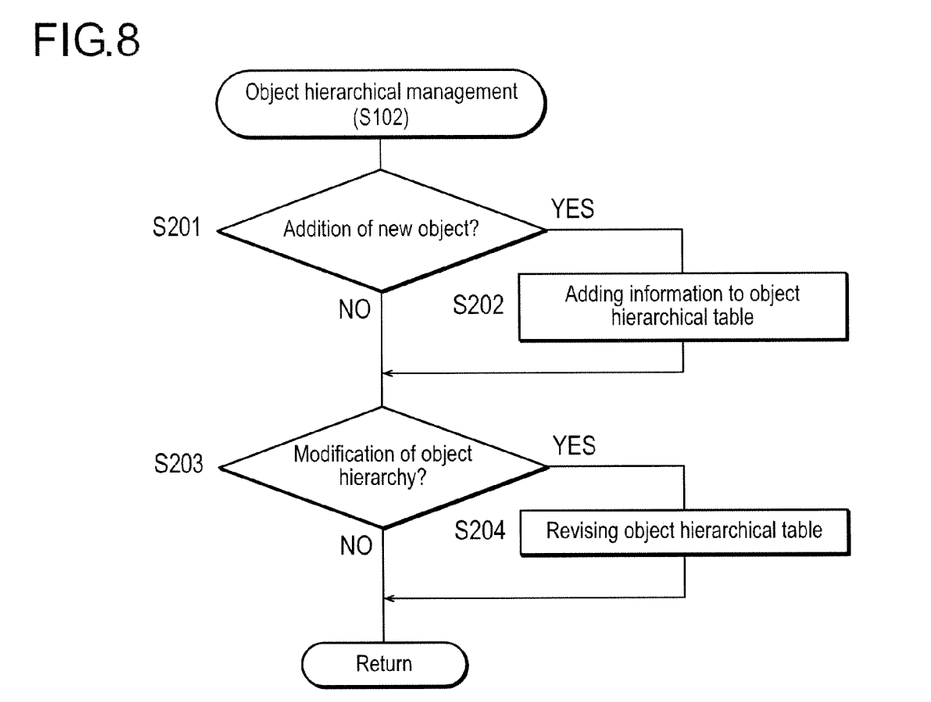
FIG. 8 is a flowchart showing the steps of object hierarchical management according to an embodiment of the present invention.

FIG. 8 is a flowchart showing the steps of the object hierarchical management (S102) according to an embodiment of the present invention. As shown in FIG. 8, the PC 1 determines whether or not the layout instruction obtained in the latest S101 includes addition of a new object (S201). If the layout instruction includes the addition of a new object (S201: Yes), the program adds information on the new object to the object hierarchical table T in the memory unit 12 (S202) before moving onto S203. On the other hand, if the layout instruction does not include the addition of a new object (S201: No), the program moves onto S203 without adding information to the table.

Figure 9:
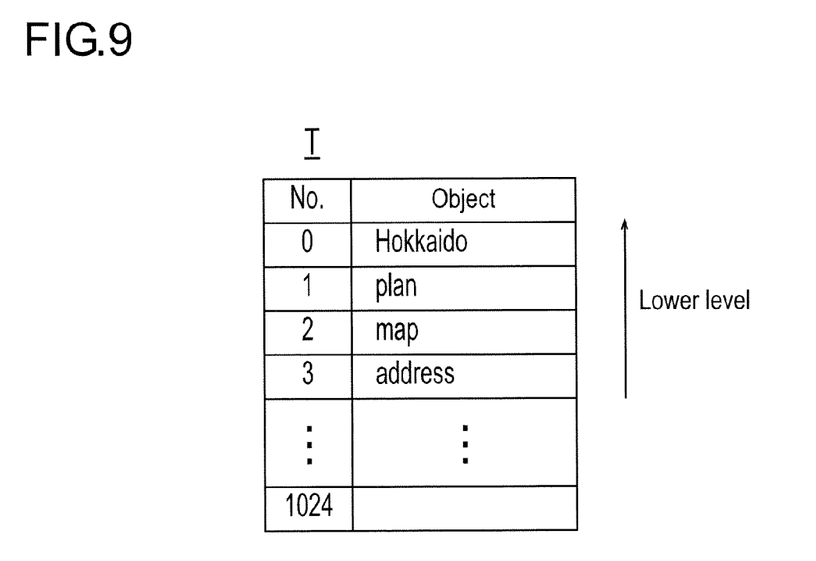
FIG. 9 is a schematic diagram illustrating an object hierarchical table according to an embodiment of the present invention.

FIG. 9 is a schematic diagram illustrating the object hierarchical table T according to an embodiment of the present invention. As shown in FIG. 9, the object hierarchical table T shows hierarchy of the constituent objects of the VDP data in process of the VDP data generation. The table T in FIG. 9 indicates that the VDP data in process of the VDP data generation contains the objects named "hokkaido", "plan", "map", and "address" in the order of the hierarchical level from the lowest to the highest.

The PC 1 determines whether or not the layout instruction obtained in the latest S101 includes modification of the object hierarchy (S203). If the modification of the object hierarchy is included in the layout instruction (S203: Yes), the program revises the object hierarchy table T in the memory unit 12, accordingly (S204), before returning to the flowchart in FIG. 6A. On the other hand, the PC 1 will returns to the flowchart in FIG. 6A without revising the table T if the modification of the object hierarchy is not included in the layout instruction (S203: No).

With reference to FIG. 6A, the PC 1 repeats the aforementioned steps S101-S102 until it receives a VDP data generation instruction (S103: No), and moves onto S104 when it receives the instruction (S103: Yes). The VDP data generation instruction herein refers to an instruction to start generating VDP data based on the latest layout settings which have been specified by user on the layout setting GUI. The PC 1 acquires a VDP data generation instruction when user performs a certain operation on the GUI (e.g. pressing down "Job generation" button).

The PC 1 establishes communication with the printer controller 21 via the network N to acquire the supported format information stored in the memory unit 211 (S104). The PC 1 then reads the supported format information into the RAM of the memory unit 12 (S105). In the present embodiment, the PC 1 can also store the supported format information in the memory unit 12 beforehand, instead of communicating with the printer controller 21 each time it receives a VDP data generation instruction as in S104.

As mentioned above, the supported format information refers to information showing the VDP data formats which are supported by the printer controller 21. The supported format information in this example indicates that the printer controller 21 supports FreeForm®, PPML, and optimized PS.

The PC 1 refers to the object hierarchy table T in the memory unit to identify the lowest level object in the hierarchy (S106). The PC 1 then refers to the database D to determine whether or not the lowest level object identified in S106 corresponds to reusable data common to all the records (S107). If the lowest level object corresponds to reusable data common to all the records (S107: Yes), the PC 1 further determines whether or not data size of the lowest level object exceeds a predefined threshold value (S108). In S108, the PC 1 can also determines whether or not resolution of the lowest level object exceeds a predefined threshold value (e.g. 300 dpi), or area of the lowest level object exceeds a predefined threshold value (e.g. 100 $cm^2$), instead of determining whether or not data size of the lowest level object exceeds a predefined threshold value.

If the data size exceeds the threshold value (S108: Yes), meaning that the object layout obtained in S101 falls into the Group 1 in the Table 1, the PC 1 generates a format flag corresponding to the most suitable format to the layout i.e. "Free Form" and stores it into the RAM (S111). The PC 1 then moves onto S118.

On the other hand, if the data size does not exceed the threshold value (S108: No), the PC 1 confirms existence of a higher-level object (S109: Yes) and identifies the next-level object in the hierarchy (S110) as it is still unclear whether or not the object layout acquired in S101 falls into the Group 1 in the Table 1. On the other hand, if there is no higher-level object in the hierarchy (S109: No), meaning that the layout acquired in S101 falls into the Group 3 in the Table 1, the PC 1 generates a format flag corresponding to the most suitable format to the layout i.e. "Optimized PS" and stores it into the RAM (S117). The PC 1 then repeats S107 onwards with respect to the object identified in S110. In S108 in the second round onwards, the PC 1 determines whether or not the total data size from the lowest level object identified in S106 to the current object identified in the latest round of S110 exceeds the threshold value.

If the object identified in S106 does not correspond to reusable data common to all the records (S107: No), the PC 1 further determines whether or not the object identified in S106 corresponds to reusable data common to more than one record (S112). If the object identified in S106 corresponds to reusable data common to more than one record (S112: Yes), the PC 1 further determines whether or not the total data size exceeds the threshold value (S113). Similar to S108, the PC 1 can also determines whether resolution of the object exceeds a predetermined threshold value (e.g. 300 dpi), or area of the object exceeds a predefined threshold value (e.g. 100 $cm^2$), instead of determining whether or not the data size exceeds a predefined threshold value.

If the data size exceeds the threshold value (S113: Yes), meaning that the layout acquired in S101 falls into the Group 2 in the Table 1, the PC 1 generate a format flag corresponding to the most suitable format to the layout i.e. "PPML" and stores it into the RAM (S116). The PC 1 then moves onto S118.

On the other hand, if the data size does not exceed the threshold value (S113: No), the PC 1 confirms existence of a higher-level object (S114: Yes) and identifies the next-level object in the hierarchy (S115) as it is still unclear whether or not the layout acquired in S101 falls into the Group 2 in the Table 1. If there is no higher-level object in the hierarchy (S114: No), meaning that the layout acquired in S101 falls into the Group 3 in the Table 1, the PC 1 generates a format flag corresponding to the most suitable format to the layout i.e. "Optimized PS" and stores it into the RAM (S117). The PC 1 then repeats S112 onwards with respect to the object identified in S115. In S113 in the second round onwards, the PC 1 determines whether or not the total data size from the lowest level object identified in S106 to the current object identified in the latest S115 exceeds the threshold value.

Next, the PC 1 selects the format corresponding to the format flag stored in the RAM of the memory unit 12, and generates the VDP data in the selected format (S118). The PC 1 then finishes the series of steps. The VDP data generated in S118 will be immediately transmitted to the printer controller 21 via the network N, but it can also be stored in the hard disk of the memory unit 12 for the time being.

As can be seen from the above, the present embodiment involves classifying an object layout of VDP data, and generating the VDP data in the predetermined format (i.e. Free-Form®, PPML, or Optimized PS) for the classification result of the object layout (i.e. Group 1 to Group 3). Therefore, the present embodiment can effectively avoid selecting an unsuitable format or handling the object layout of the VDP data by means of predetermining the most suitable format achieving the shortest processing time for each of the layout classifications.

The present invention shall not be limited to the aforementioned embodiment, and hence it can be modified within the scope of the appended claims. For example, the printing data generating apparatus according to the present invention can also be implemented by a function of a printer or a multi-functional peripheral (MEP), instead of the PC 1 illustrated in the embodiment mentioned.

The printing data processing device according to the present invention can also be implemented by a dedicated hardware circuit capable of executing the aforementioned steps, or by a program executed by a CPU to perform the aforementioned steps. If the present invention is implemented by the latter means, the program for controlling the printing data processing device can take a form of a computer readable recording medium such as a Floppy® disk or CD-ROM, or a downloadable file supplied on-line via a network such as Internet. In the former case, the program recorded in the computer readable recording medium is normally transmitted to a memory unit such as a ROM or a hard disk. The above program can also take a form of an application software program or a built-in function of the print data generating apparatus.

What is claimed is:

1. A print data generating method for generating print data for variable data printing in a plurality of formats comprising steps of:
   (A) classifying layout of objects which constitute said print data;
   (B) selecting a predetermined format for classification result in said step (A) from said plurality of formats; and
   (C) generating said print data in said selected format in said step (B), wherein:
   said plurality of formats includes a first format which involves treating a common object to all records in distinction from other objects, and a third format which involves treating a common object to more than one record without distinction from other objects;
   said step (A) includes classifying said layout into a first group if said layout contains a common object to all records and total data size of common objects to all records exceeds a threshold value, and classifying said object into a third group if said layout contains a common object to all records and total data size of common objects to all records does not exceed said threshold value;
   said step (B) includes selecting said first format if said layout is classified into said first group in said step (A), and selecting said third format if said layout is classified into said third group in said step (A);
   said plurality of formats further includes a second format which involves treating a common object to more than one record in distinction from other objects;
   said step (A) involves classifying said layout into a second group if said layout contains a common object to more than one record but not to all records and total data size of common objects to more than one record but not to all records exceeds said threshold value, and classifying said layout into said third group if said layout contains a common object to more than one record but not to all records and total data size of common objects to more than record but not to all records does not exceed said threshold value; and
   said step (B) includes selecting said second format if said layout is classified into said second group in said step (A).

2. A non-transitory computer readable recording medium storing a program for generating print data for variable data printing in a plurality of formats, said program causing a print data generating apparatus to perform steps of:
   (A) classifying layout of objects which constitute said print data;
   (B) selecting a predetermined format for classification result in said step (A) from said plurality of formats; and
   (C) generating said print data in said selected format in said step (B), wherein:
   said plurality of formats includes a first format which involves treating a common object to all records in distinction from other objects, and a third format which involves treating a common object to more than one record without distinction from other objects;
   said step (A) includes classifying said layout into a first group if said layout contains a common object to all records and total data size of common objects to all records exceeds a threshold value, and classifying said layout into a third group if said layout contains a common object to all records and total data size of common objects to all records does not exceed said threshold value;
   said step (B) includes selecting said first format if said layout is classified into said first group in said step (A), and selecting said third format if said layout is classified into said third group in said step (A);
   said plurality of formats further includes a second format which involves treating a common object to more than one record in distinction from other objects;
   said step (A) includes classifying said layout into a second group if said layout contains a common object to more than one record but not to all records and total data size of common objects to more than one records but not to all records exceeds said threshold value, and classifying said layout into said third group when said layout contains a common object to more than one record but not to all records and total data size of common objects to more than one record but not to all records does not exceed said threshold value; and
   said step (B) includes selecting said second format if said layout is classified into said second group in said step (A).

* * * * *